(12) United States Patent
Gasworth et al.

(10) Patent No.: US 8,647,721 B2
(45) Date of Patent: Feb. 11, 2014

(54) PART MARKING OF COATED PLASTIC SUBSTRATES

(75) Inventors: Steven M. Gasworth, Novi, MI (US); Gregory R. Harley, Flagstaff, AZ (US); Eric F. J. M. van der Meulen, Wixom, MI (US); Stephen Shuler, Royal Oak, MI (US)

(73) Assignee: Exatec, LLC, Wixom, MI (US)

( * ) Notice: Subject to any disclaimer, the term of this patent is extended or adjusted under 35 U.S.C. 154(b) by 732 days.

(21) Appl. No.: 12/613,038

(22) Filed: Nov. 5, 2009

(65) Prior Publication Data

US 2010/0112317 A1 May 6, 2010

Related U.S. Application Data

(60) Provisional application No. 61/111,652, filed on Nov. 5, 2008.

(51) Int. Cl.
*B05D 3/06* (2006.01)
(52) U.S. Cl.
USPC .......................... 427/554; 427/553; 427/596
(58) Field of Classification Search
USPC .......... 427/532, 553, 554, 595, 596; 428/203; 346/135.1; 503/200; 430/945, 363
See application file for complete search history.

(56) References Cited

U.S. PATENT DOCUMENTS

| | | | |
|---|---|---|---|
| 3,657,085 A | 4/1972 | Hoffmeister | |
| 3,962,513 A | 6/1976 | Eames | |
| 4,822,973 A | 4/1989 | Fahner et al. | |
| 5,075,195 A | 12/1991 | Babler et al. | |
| 5,206,496 A | 4/1993 | Clement et al. | |
| 5,339,584 A * | 8/1994 | Ohtake et al. | 52/208 |
| 5,767,483 A | 6/1998 | Cameron et al. | |
| 5,897,938 A | 4/1999 | Shinmoto et al. | |
| 6,207,344 B1 | 3/2001 | Ramlow et al. | |
| 6,309,755 B1 * | 10/2001 | Matsco et al. | 428/451 |
| 6,444,068 B1 | 9/2002 | Koops et al. | |
| 6,541,189 B1 | 4/2003 | Caporaletti et al. | |

(Continued)

FOREIGN PATENT DOCUMENTS

| | | |
|---|---|---|
| DE | 195 17 625 | 11/1996 |
| DE | 10 2005 027 803 | 12/2006 |

(Continued)

OTHER PUBLICATIONS

German Patent No. 102005027803 (A1); Publication Date: Dec. 21, 2006; Abstract Only; 1 Page.

(Continued)

*Primary Examiner* — Dah-Wei Yuan
*Assistant Examiner* — Nga Leung V Law
(74) *Attorney, Agent, or Firm* — Cantor Colburn LLP

(57) ABSTRACT

A plastic panel assembly having a permanent mark therein at a subsurface location and formed after substantial manufacture of the panel assembly. The plastic panel includes a substrate and a coating over the substrate, the coating including a surface that defines an exterior surface of the panel assembly. A mark is located beneath the exterior surface of the panel assembly. In making the panel assembly, a plastic substrate is provided and a protective coating is applied to the substrate. After the step of applying the protective coating, a subsurface portion of panel assembly is exposed to a laser light. The laser light opacifies a subsurface portion of the panel assembly, thereby rendering the mark within the panel assembly.

10 Claims, 4 Drawing Sheets

(56) References Cited

U.S. PATENT DOCUMENTS

| | | |
|---|---|---|
| 6,852,948 B1 | 2/2005 | Harrison |
| 2004/0071994 A1 | 4/2004 | Busch et al. |
| 2005/0066348 A1 | 3/2005 | Limousin |
| 2006/0074165 A1 | 4/2006 | Gelissen et al. |
| 2008/0076065 A1 | 3/2008 | Bennett et al. |
| 2008/0107880 A1 | 5/2008 | Kliesch et al. |

FOREIGN PATENT DOCUMENTS

| | | | |
|---|---|---|---|
| DE | 10 2005 027 822 | | 12/2006 |
| EP | 1685920 | A1 | 8/2006 |
| JP | 5058024 | A | 3/1993 |
| JP | 5155130 | A | 6/1993 |
| JP | 8146362 | A | 6/1996 |
| JP | 11034502 | A | 2/1999 |
| JP | 2007038594 | A1 | 2/2007 |
| JP | 2007304377 | A | 11/2007 |
| JP | 2008230140 | A | 10/2008 |
| WO | WO 95/34263 | | 6/1995 |
| WO | WO 98/40224 | | 3/1998 |
| WO | 2006037973 | A1 | 4/2006 |
| WO | WO 2006/117312 | | 4/2006 |
| WO | WO 2006072797 | A1 * | 7/2006 |
| WO | WO 2008/035043 | | 9/2007 |
| WO | WO 2008/107345 | | 2/2008 |

OTHER PUBLICATIONS

German Patent No. 102005027822 (A1); Publication Date: Dec. 21, 2006; Abstract Only; 1 Page.

German Patent No. 19517625 (A1); Publication Date: Nov. 14, 1996; Abstract Only; 1 Page.

Japanese Patent No. 5058024 (A); Publication Date: Mar. 9, 1993; Abstract Only; 1 Page.

Japanese Patent No. 5155130 (A); Publication Date: Jun. 22, 1993; Abstract Only; 1 Page.

Japanese Patent No. 8146362 (A); Publication Date: Jun. 7, 1996; Abstract Only; 1 Page.

International Search Report; International Application No. PCT/US2009/063395; International Filing Date: Nov. 5, 2009; Date of Mailing: May 25, 2010; 2 Pages.

Written Opinion of the International Searching Authority; International Application No. PCT/US2009/063395; International Filing Date: Nov. 5, 2009; Date of Mailing: May 25, 2010; 3 Pages.

Japanese Patent No. 11034502 (A); Publication Date: Feb. 9, 1999; Abstract Only; 1 Page.

Japanese Patent No. 2007038594 (A); Publication Date: Feb. 15, 2007; Abstract Only; 1 Page.

Japanese Patent No. 2007304377 (A); Publication Date: Nov. 22, 2007; Abstract Only; 2 Pages.

Japanese Patent No. 2008230140 (A); Publication Date: Oct. 2, 2008; Abstract Only; 1 Page.

DE10222926 A1, Dec. 4, 2003, Abstract Only, 2 pages.

DE19732306 A1, Jan. 28, 1999, Abstract Only, 1 page.

DE19944372 A1, Mar. 22, 2001, Abstract Only, 1 page.

Extended Search Report for European Application No. 09825410.5, Filed with the European Patent Office on Mar. 10, 2011, Date of Completion of Report Jun. 11, 2013, 5 pages.

CN1163199, Oct. 29, 1997, Abstract Only, 1 page.

* cited by examiner

PART MARKING OF COATED PLASTIC SUBSTRATES

CROSS REFERENCE TO RELATED APPLICATIONS

This application claims priority to U.S. provisional application 61/111,652, filed Nov. 5, 2008, the entire contents of which are hereby incorporated by reference.

BACKGROUND OF THE INVENTION

1. Field of the Invention

The present invention generally relates to the marking of the body of an object with a permanent indicium or mark. More specifically, the invention relates to using a high energy density beam, such as a laser light, to permanently mark a plastic product in a subsurface location after fully forming, or substantially fully forming, the product.

2. Related Technology

In many industries, it is desirable to mark a product to limit counterfeiting, facilitate tracking, or aid in performance verification and/or traceability for regulatory compliance.

One technology in which marking occurs for regulatory compliance purposes is automotive safety glazings, such as windshields, side windows and backlites (rear windows). The requirements for such marks are set out in Section 7 of ANSI/SAE Z26.1-1996 and in Paragraph S6.2 of 49CFR571.205. These requirements relate to both the form of the mark and the performance that it certifies. With regard to form, the regulations set forth requirements with regard to legibility, minimum height of letters and numerals and permanence of the mark. Regarding performance, the above regulations require that the glazing manufacturer certify, by adding the appropriate mark, that the glazing meets certain requirements regarding optical transmissivity, impact resistance, abrasion resistance and the like. The implication of this requirement is that the achievement of these performance standards should precede the actual marking of the glazing. From a manufacturing standpoint, this means that, in all aspects that bear on performance, the glazing product should be fully formed, or substantially fully formed, prior to certification by marking.

Today's automotive vehicles typically utilize glazings that are made of glass. In order to effectuate the marking of glass glazings, various methods have been used. The two most widely used methods are physical etching and chemical etching. With physical etching, the part is sandblasted to physically form the mark in the product. With chemical etching, various chemicals are used to dissolve portions of the glazing so as to form the mark. More recently, glass glazings have been marked using high energy density beams, such as laser lights.

Also recently, automotive glazings have been manufactured from materials other than glass. Specifically, plastic materials, such as polycarbonate, have been used to replace glass in various automotive glazing applications including side windows, backlites and moon roofs. While plastic materials give more freedom in the style and shape of the glazing, plastic glazings offer challenges beyond those found in glass glazings. For example, plastic glazings are susceptible to degradation when exposed to ultraviolet radiation, such as that found in sunlight. Additionally, the plastics used in these glazings are softer than glass and, therefore, more susceptible to abrasion by external elements.

To overcome these and other limitations, plastic glazing systems have been developed with a plastic substrate coated with at least one protective coating. Typically, at least two protective coatings are employed, namely a weathering coating and an abrasion resistant coating. The weathering coating specifically reduces the amount of ultraviolet radiation penetrating to the underlying plastic substrate. The abrasion resistant coating, located exteriorly at the weathering coating, resists abrasion that results from exposure to external elements such as dirt, sand and other road debris.

As noted above, the governmental regulations for glazings requires the glazing manufacturer to certify that each piece of glazing meets various requirements (e.g., to ensure a necessary degree of transparency and abrasion resistance in the glazing for driver visibility). This certification requires the addition of 'DOT' and a manufacturer code (assigned by the National Highway and Transportation Safety Administration to the manufacturer of the glazing) to the glazing. The certification requirement implies that the glazing meets the applicable performance standards prior to receiving the mark. Thus, when viewed from a manufacturing standpoint, the regulations implicitly require that, before marking occurs, the glazing be fully formed in all aspects that bear on certification. Protective coatings applied over the plastic substrate generally impact the abrasion resistance and the optical transmissivity of the glazing and, therefore, in the spirit of the regulation, the panels should not be marked until after the protective coatings have been applied.

Applying a mark to the plastic glazing after the application of the protective coatings, however, presents several issues. First, application of the mark itself must not adversely affect the protective coatings or the underlying substrate. Additionally, application of the mark must comply with the permanence requirements and not be subject to wear and obliteration, resulting from the rubbing and scraping of the mark. While the spirit of the regulation requires the application of the mark after the plastic glazing has been fully, or substantially fully, manufactured, if a feature were to be applied directly to the plastic substrate before the application of a wet coat protective coating, a resulting visibility defect, typically an optical distortion around the mark, may result around that feature.

SUMMARY OF THE INVENTION

In satisfying the above need, as well as overcoming the enumerated drawbacks and other limitations of the related art, the present invention provides a method of making a plastic panel having a permanent mark therein.

In one aspect, the present invention is a method of making a plastic panel assembly having a permanent mark therein, including the steps of providing a plastic substrate and applying a protective coating to the substrate such that a surface of the protective coating defines an exterior surface of the panel assembly. After the step of applying the protective coating, at least a portion of panel assembly is exposed to a laser light causing a location beneath the exterior surface of the portion of the panel to physically change, thereby defining the mark on the panel assembly.

In another aspect, the portion of the panel exposed to the laser light includes at least a portion of the substrate.

In a further aspect, the portion of the panel exposed to the laser light includes at least a portion of the coating.

In a further aspect, the method comprises the step of applying a patch containing laser active particles to the substrate to form an active region.

In an additional aspect, the active region is transparent.

In an additional aspect, the protective coating is a first protective coating and the method further comprises applying a second protective coating over the first protective coating, the second protective coating being an abrasion resistant coating.

In another aspect, the protective coating is defined by layers, including a primer layer and topcoat layer, and a patch is applied on top of the primer layer to form the active region.

In still another aspect, the patch is applied between the primer layer and the topcoat layer.

In yet another aspect, the exposing step exposes at least a portion of the active region to the laser light.

In a further aspect, the exposing step exposes only part of the active region to the laser light.

In a still further aspect, the laser light opacifies the active particles to define the mark on the panel.

In another aspect, the method further comprises the step of curing the primer layer.

In an additional aspect, the method further comprises the step of curing the topcoat layer.

In another aspect, a plastic panel assembly is provided having a permanent mark therein. The panel assembly comprises a substrate; a coating over the substrate, with a surface of the coating defining an exterior surface of the panel assembly; and a mark defined by a physically changed portion of the panel assembly located beneath the exterior surface of the panel assembly.

In another aspect, the mark is at least partially located within the substrate.

In a further aspect, the mark is at least partially located outside of the substrate.

In an additional aspect, the coating further comprises a primer layer and a topcoat layer.

In yet another aspect, the coating comprises an abrasion resistant coating over a weathering coating, the weathering coating including a primer layer beneath a topcoat layer.

In still a further aspect, laser active particles are dispersed within a portion of the panel assembly and at least some of the particles define the mark.

In yet an additional aspect, the laser active particles are dispersed within a patch that is incorporated into the panel.

In another aspect of the invention, the patch is applied as a patch solution.

In yet another aspect, the patch is applied as a physical object having a defined shape.

In another aspect, the patch is located between the protective coating and the substrate.

In a further aspect, the coating includes a topcoat layer and a primer layer, the primer layer being located adjacent to the substrate, the patch being located between the primer layer and the topcoat layer.

In yet another aspect, suitable additives are provided in the substrate matrix material (or in coatings thereon) to affect at least one of sensitivity of the material to laser light, color, contrast and resolution of the mark.

Further objects, features and advantages of this invention will become readily apparent to one skilled in the art after a review of the following description, with reference to the drawings and claims that are appended to and form a part of this specification.

DETAILED DESCRIPTION OF THE PREFERRED EMBODIMENTS

Figure 1:
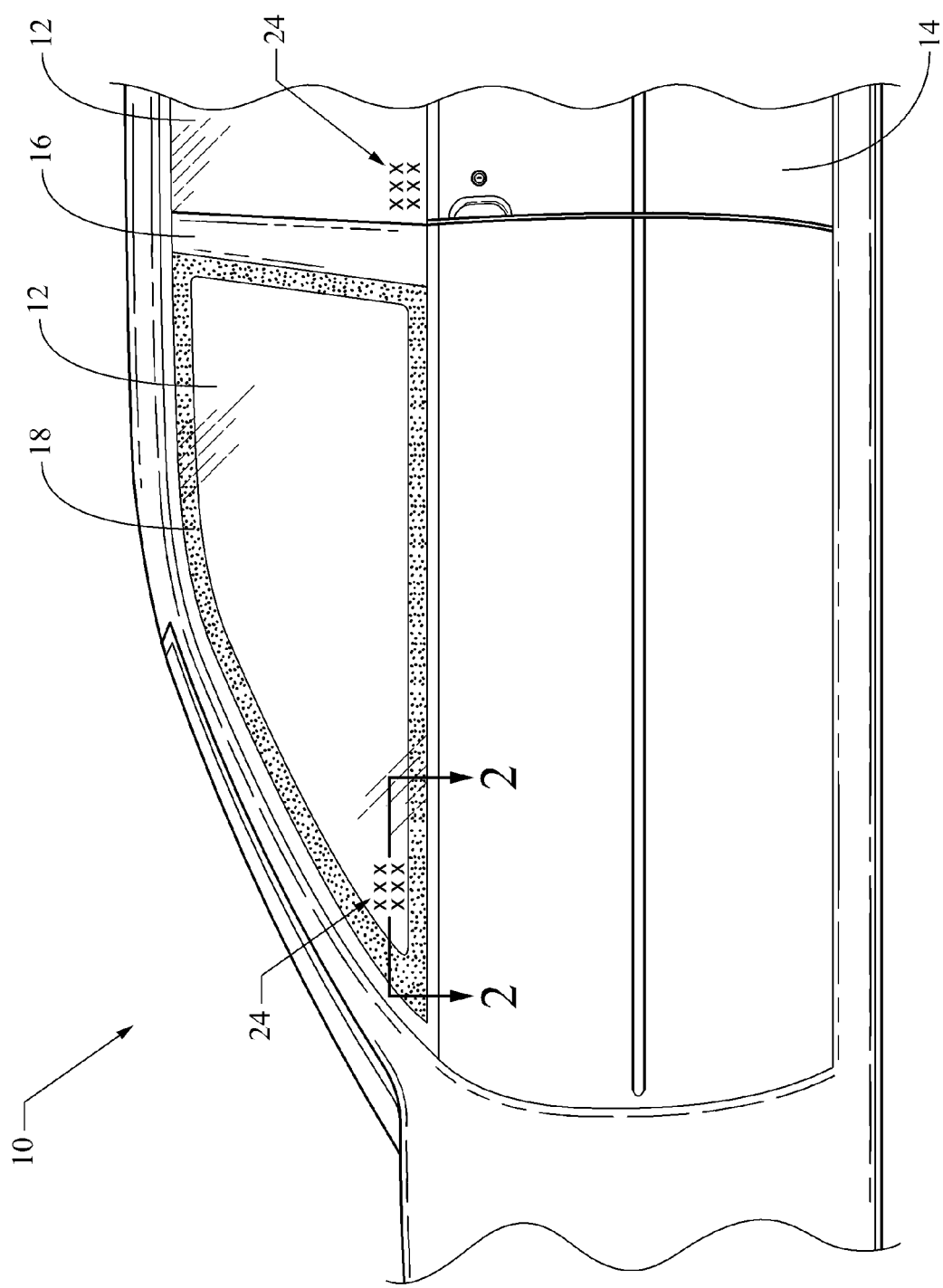
FIG. 1 is a partial perspective view of an automotive vehicle incorporating a glazing according to the principles of the present invention.

As seen in FIG. 1, an automotive vehicle (10) is partially illustrated therein as incorporating glazings (12) embodying the principles of the present invention. As used herein, the term "glazing" means a transparent panel for use as a window. Two glazings (12) are seen in this figure: one glazing (12) being located above a door panel (14) of the vehicle (10) and the other glazing (12) being located rearward (toward the left in the figure) of the B pillar (16) of the vehicle (10). While illustrated and described as a side window in the vehicle (10), it will be appreciated by those skilled in the art that glazings (12) to which the present invention relates could additionally be incorporated into the vehicle (10) as any window thereof, including the windshield, backlite or moon roof of the vehicle. Further, it will be appreciated that the invention is also applicable to transparent, semi-transparent and non-transparent plastic components (automotive and non-automotive) that are not used as windows or glazing. These other components may not be subject to regulatory marking requirements, but may benefit from a permanent mark applied to a finished and qualified part, such as for tracking or labeling purposes. Notwithstanding the alternative applications for the invention, the description which follows illustrates the particular application of the invention to automotive vehicle glazings, without intending to be limited thereto.

The two glazings (12) seen in FIG. 1 are generally representative of glazings used in automotive vehicles (10). For example, the glazing (12) associated with the door (14) is provided such that it is transparent across its full extent. The glazing (12) located rearward of the B pillar (16) is transparent over a majority of its extent, but is additionally provided with an opaque border (18) about its perimeter. The border (18) is provided for aesthetic purposes and, as such, may be provided as a blackened area (20) and/or a series of fade-out dots (22) (shown in FIG. 2) that operate as a transition from the transparent region of the glazing (12) to the non-transparent region of the border (18). Such borders are often used to conceal mounting features (such as tabs and/or bonding adhesive) that may be utilized with the glazing (12) and to limit exposure of such features to ultraviolet radiation present in sunlight.

As noted above, in order to comply with governmental regulations, glazings used in automotive vehicles include various marks that certify compliance with the governmental regulations concerning performance and origin. Each of the glazings (12) seen in FIG. 1 is provided with a mark that is generally designated at (24). As seen therein, the marks (24) are abstractly illustrated as a series of Xs.

Figure 2:
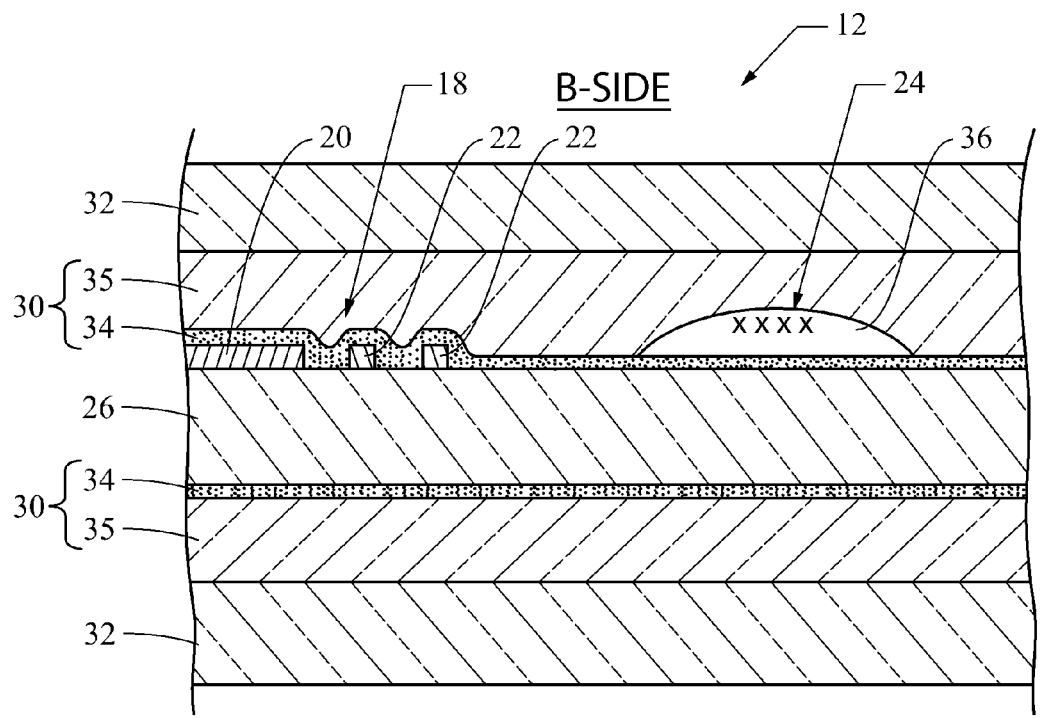
FIG. 2 is a cross-sectional schematic illustration, generally taken along line 2-2 of FIG. 1, of a glazing embodying the principles of the present invention.

Referring now to FIG. 2, a schematic cross-sectional view through a glazing (12) is shown therein. For reference, the glazing (12) is referred to as having an A-side and a B-side. The A-side represents the side of the glazing (12) that is oriented toward the exterior of the vehicle (10). The B-side is therefore the side of the glazing (12) that is oriented toward the interior of the vehicle (10). In FIG. 2, the A-side of the glazing (12) is located toward the bottom of the figure and the B-side of the glazing (12) is located toward the top of the figure.

Generally, the glazing (12) includes a base layer or substrate (26). Adjacent to the substrate (26) is one or more protective coatings. The protective coating may be provided on both or just one of the A and B-sides of the glazing (12) and may be the same or different on those sides. As illustrated, multiple protective coatings are provided and include a weathering coating (30) and an abrasion resistant coating (32).

The substrate (26) is preferably formed of a thermoplastic resin, illustrative examples of which include polycarbonate, acrylic, polyacrylate, polyester, polysulfone, copolymers or any other suitable plastic material or a mixture thereof. The substrate (26) may include polymethacrylate (PMMA), polyester, bisphenol-A polycarbonate (PC) or other PC resin grades (such as branched or substituted), as well as PC copolymerized or blended with other polymers, thereby forming a blend with materials such as acrylonitrile butadiene styrene (ABS) or polyester. The material of the substrate (26) may further include various additives, such as colorants, mold release agents, anti-oxidants, infrared radiation absorbers and ultraviolet radiation absorbers. The substrate (26) may be formed or shaped through the use of any technique known to those skilled in the art, such techniques including injection molding, blow molding, compression molding, thermoforming, the latter including thermal forming, vacuum forming and cold forming. Although not necessary, the aforementioned techniques may be used singly or in combination with each other.

As noted above, applied over the substrate (26) are one or more protective coatings. While two protective coatings (30, 32) are illustrated as being applied on both the A and B-sides of the glazing (12), both protective coatings need not necessarily be provided on both sides, nor need they be identical on both sides. For example, the weathering coating (30), which protects the substrate (26) from the harmful effects of sunlight, may optionally be excluded from the B-side of the glazing (12). Since sunlight is primarily incident on the A-side of the glazing (12), providing the weathering coating (30) on the B-side of the glazing (12) is not as important as providing it on the A-side. Similarly, the abrasion resistant coating (32) may be optionally applied to either the A or B-side of the glazing (12).

Prior to application of the protective coatings, if the glazing (12) is to include the optional opaque border (18), the border (18) is provided by applying an opaque material about the perimeter of the substrate (26). The blackened area (20) and/or fade-out dots (22) of the border (18) may be applied to the substrate (26) by various techniques, including without limitation, screen printing, pad printing and membrane image transferring. Materials for the opaque border (18) include the various inks and ink systems as are known in the art and compatible with the substrate (26) and the protective coatings (30, 32).

The weathering coating (30) is preferably applied as a wet coat over the substrate (26) and, while other coating systems may be used, is a polyurethane coating or a silicone hard coat. As an alternative to a single layer-type weathering coating (30) and in order to enhance and maximize adhesion of the weathering coating (30) to the substrate (26), the weathering coating (30) may comprise multiple layers, such as a primer layer (34) and a topcoat layer (35). The primer layer (34) may be applied by standard methods, e.g., flow coating, over the substrate (26) and the optional blackened area (20) and fade-out dots (22) of the border (18). Depending on the nature of the weathering coating (30), the primer layer (34) may be any known primer suitable for the intended purpose, including an acrylic primer. The primer layer (34) may also include additives, such as but not limited to, surfactants, anti-oxidants, biocides, ultraviolet absorbers and drying agents. If a silicone hard coat is provided as the topcoat layer (35) over the primer layer (34), the resin of the topcoat layer (35) is preferably a methylsilsequioxane resin dispersed in a mixture of alcohol solvents. The topcoat layer (35) may comprise other additives, such as those mentioned in connection with the primer layer (34). In applying the topcoat layer (35), known methods for applying the topcoat layer (35) may be utilized, including flow coating, dip coating, curtain coating, spray coating or other processes known to those skilled in the art.

The abrasion resistant coating (32) is optionally applied over the weathering coating (30), or absent the weathering coating (30), the abrasion resistant coating (32) is optionally applied directly over the substrate (26). Preferably, the abrasion resistant coating (32) is a substantially inorganic coating of the variety known in the art. The abrasion resistant coating (32) may be applied by any technique known to those skilled in the art, including deposition from a reactive species, such as those employed in vacuum deposition processes and atmospheric pressure processes. As such, the application technique may include plasma enhanced chemical vapor deposition, expanding thermal plasma deposition, ion assisted plasma deposition, magnetron sputtering, electron beam evaporation, ion beam sputtering, curtain coating, spray coating, spin coating, dip coating and flow coating.

The present invention further includes the providing of a mark (24) on the glazing (12). While the mark (24) is visible, as seen in FIG. 1, it is important to note that this mark is not provided on the exterior surface of the glazing (12), or more specifically, it is not provided on the exterior surface of the protective coating(s). Rather, with the present invention, the mark (24) is provided at a subsurface location in the glazing (12) after application of the protective coating(s) to the substrate (26).

In the embodiment of FIG. 2, a patch (36) is provided on the B-side. The patch (36), however, may be applied onto either the A or B-side. The patch (36) can be applied either directly to the substrate (26) prior to application of the weathering coating (30) or can be applied over the primer layer (34) before the application of the topcoat layer (35), the latter being when a primer layer (34) and topcoat layer (35) weathering coating (30) system is used. Preferably, the thickness of the patch (36) is less than the thickness of the weathering coating (30) or the topcoat layer (35) thereof that would be obtained in the absence of the patch at the specific location of the patch (36). This facilitates a smooth exterior surface for the weathering coating (30) or topcoat layer (35) once applied to the substrate (26). To further facilitate smooth subsequent coating with the weathering coating (30) or topcoat layer (35), it is preferred that the thickness of the patch (36) tapers at its sides, as seen in FIG. 2. By providing the patch (36) with a thickness that is less than the thickness that would otherwise be achieved by the protective coatings, the protective coatings are able to planarize (smooth out) the roughness introduced by the patch (36) due to presence of the patch (36) or the process by which the patch (36) is applied.

The patch (36) may be applied to the substrate (26) or primer layer (34) through a variety of methods and constructions. In one embodiment, the patch (36) is of a predefined physical size and shape and is applied to the substrate (26) or primer layer (34) by physically placing the patch (36) at the desired location. In another embodiment, the patch (36) is not a physically defined object, but rather is applied in solution form to the substrate (26) or primer layer (34). In either embodiment, the mark (24) is not initially present in the patch (36). To achieve marking, included in the patch (36) are particles that are activated, darkened or opacified, (become opaque) by laser lights of various wavelengths. In other words, at least some of the particles manifest a physical change when exposed to a laser light of an appropriate wavelength, thereby rendering a visually identifiable indicium. Particles of the above type are available under the trade name Micabs® (DSM Micabs B.V., The Netherlands). Such particles are also described in U.S. Patent Publication 2006/0074165, which is herein incorporated by reference in its entirety. In order to be utilized with the present invention, the particles must be capable of being activated under a specific laser light without compromising the impact performance, coating adhesion or light transmissivity of the glazing (12) or its various coatings. Additionally, this activation of the particles must also not appreciably compromise the clarity of the material within which the particles are located.

In preparing the patch solution for application, the particles are dispersed within a matrix material that is transparent upon curing and compatible with the substrate (26), the primer layer (34) (if applied), the topcoat layer (35) (if applied), and the abrasion resistant coating (32). One possible substance for the matrix material is a composition of the topcoat layer (35) material. Further, the laser-response of the particles should be matrix independent and should not have any adverse effects on the matrix material itself. Thus, for example, the particles should not affect UV stability of the matrix. Moreover, the particles should not migrate and should be stable up to temperatures suitable for application of the various coatings thereover.

Additionally, the particles should be of a suitable size and concentration in the matrix so that the used laser light parameters do not cause damage to the various coatings or substrate. Additionally, the particles should be selected such that they are activated by laser light wavelengths that are themselves not blocked or substantially absorbed by the protective coatings or portions thereof. The patch solution should lend itself to known application techniques to a glazing during manufacturing thereof, such as those used for applying a black-out border. As such, the patch solution should be capable of being applied by standard printing techniques (including transfer from a pad or post) or crude application with a brush. Such an application of the patch solution is possible since the resultant patch (36) itself is not the image.

After the patch (36) has been applied to the substrate (26), the patch (36) is allowed to sufficiently set so that it is not displaced or thinned by the subsequent application of the weathering coating (30) and/or abrasion resistant coating (32). However, the patch (36) should not be cured to the point of inhibiting acceptable adhesion of the subsequently applied coating or coatings. The setting of the patch (36) can be accomplished under room conditions or may be accelerated by the application of heat or UV exposure, as might be appropriate based upon the matrix material and consideration of adhesion for the weathering and abrasion resistant coatings (30, 32).

As previously mentioned, in a primer/topcoat system, the topcoat layer (35) of the weathering coating (30) is applied over the patch (36). If necessary, and in order to allow for planarization of the topcoat layer (35) over the patch (36), the substrate (26) may be oriented such that the area of the substrate (26) containing the patch (36) is located lower relative to the remainder of the substrate (26) so that gravitational effects on the topcoat layer (35) cause the topcoat layer (35) to form a varied thickness or wedge over the substrate (26), with the relatively thicker end of the wedge overlaying the patch (36) and planarizing that part of the topcoat layer (35).

Once the weathering coating (30) has cured, which also preferably fully cures the patch (36), the abrasion resistant coating (32) is applied. With the application of the abrasion resistant coating (32), the glazing (12) is fully formed in all respects that bear on certification and the mark (24) can be formed.

Marking of the part occurs by exposing the laser active particles in the patch (36) to a laser light. Thus, the laser light is applied within the area over which the patch (36) extends. Upon being exposed to and absorbing the laser light, the laser active particles darken, in other words, they opacify.

In applying the laser light to the patch (36), the specific laser wavelength, power, pulse rate, pulse duration, spot size, exposure time (scan rate), and number of passes are chosen to activate the particles in the patch (36) without adversely effecting either the coatings that intervene between the laser light source and the patch (36) or the primer layer (34) and the substrate (26) underlying the patch (36). These parameters are also preferably chosen so that the intervening coatings do not interfere with the activation of the particles.

Marking can be achieved in various ways. One such method involves applying a mask over the exterior surface of the glazing (12) in the area of the patch (36) and thereafter exposing the unmasked (exposed) portions of the patch (36) to a broadened laser light spot. Alternatively, the laser light can be focused with computer controlled mirrors (a galvanic system) so as to form the desired mark or trace the desired mark. Upon exposure to the laser light, the particles darken or opacify and thereby become visible in the surrounding transparent material of the glazing (12). Of the above two methods, the mask method is faster, but is also limited in the area to which it can be applied. The galvanic system is capable of providing a higher quality image, is more flexible with respect to the area that can be marked, and is more flexible in facilitating changes in the image content.

Figure 3:
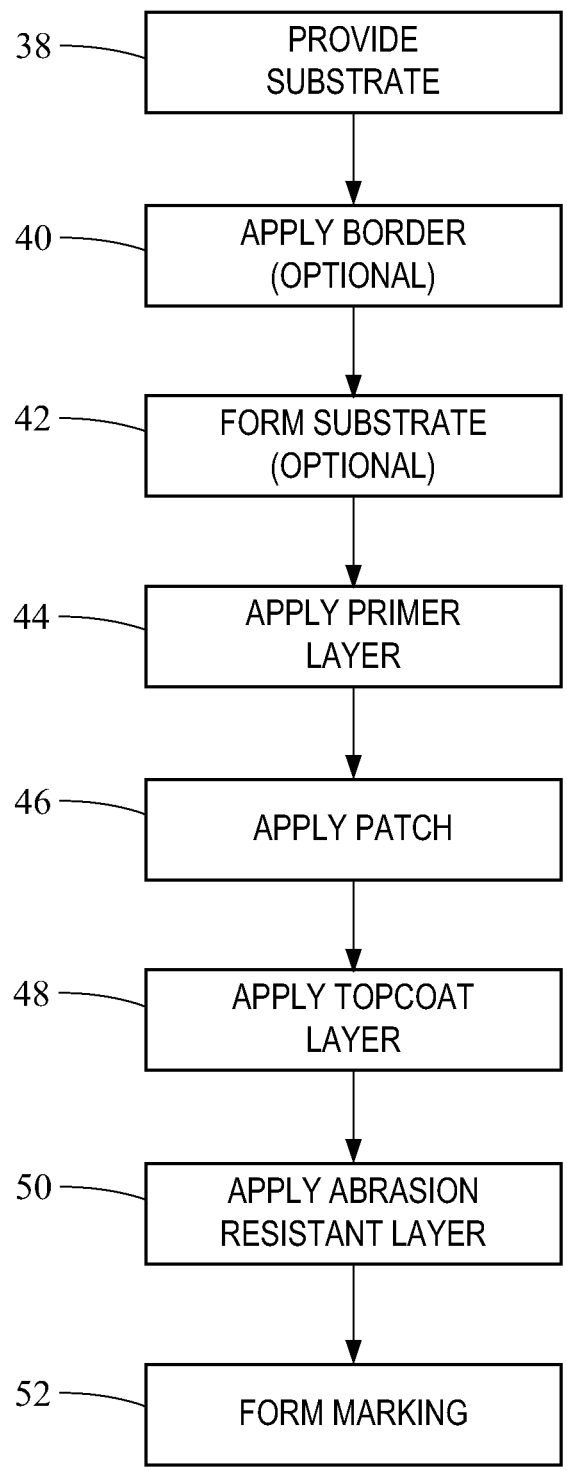
FIG. 3 is a block diagram showing a process for manufacturing a plastic glazing in accordance with the principles of the present invention.

A method for forming the mark in accordance with the principles of the present invention is therefore seen to include a number of steps. This method is generally represented in FIG. 3. One of the first steps is designated as step (38) and provides the substrate (26) upon which the additional steps will be performed. Next, if a black-out border (18) or other decoration is to be applied to the substrate (26), the border (18) is applied to the substrate (26) in step (40). If the sub-article is not already shaped and needs to be shaped or curved, the substrate (26) is then shaped or otherwise formed in step (42). Next, in step (44), the primer layer (34), if a two-layer weathering coating (30) is used, is applied over the surface of the substrate (26) and the border (18), if the latter is present. After the primer layer (34) has undergone its requisite flash off and/or curing, the patch (36) is applied to the desired area of the substrate (26), in step (46). While the patch (36) may be applied to any desired area of the substrate (26), marks (24) are typically provided on a glazing (12) such that the mark (24) is located in a lower corner of the glazing (12), when the glazing (12) is installed in the vehicle (10). With the patch (36) applied, the patch (36) is allowed to set/cure so that it will not be displaced or thinned by subsequent manufacturing steps. However, the patch (36) is not allowed to set/cure to the point where it inhibits adhesion of the subsequent layer(s) or coating(s). Once the patch (36) has adequately set, the topcoat layer (35) of the weathering coating (30) is applied to the entire surface of the substrate (26) and over the primer layer (34) and the patch (36), as designated in step (48). If desired, the abrasion resistant coating (32), such as plasma coating, is applied over the topcoat layer (35) in step (50). Finally, the mark (24) is formed in the patch (36), in step (52). In forming the mark (24), the area of the substrate containing the patch (36) is exposed to the laser light of appropriate parameters so as to activate the particles in the patch (36), thereby rendering them visible and so as to define the details of the mark (24) itself. It is preferable that the laser activation of the particles be achieved without carbonizing the matrix material or the materials located above or below the patch (36). Such carbonizing would potentially interfere with laser activation of the particles, tend to reduce resolution of the mark, and potentially release volatile products that could introduce defects into the glazing, thereby potentially compromising the various components of the glazing.

In exposing the patch (36) to the laser light, the laser hardware and software may be operated in a manner similar or identical to that described in more detail below in connection with FIG. 4. The reader's attention is accordingly directed thereto.

If the patch (36) is applied via a solution, then an additional step of the method includes preparation of the patch solution, which could occur at various stages of manufacturing prior to the application of the patch (36) itself.

In an alternative embodiment, the patch (36) can be applied about the perimeter or over the entire side of the substrate (26). In forming the mark (24), the particles may also be activated so as to form the fade out dots (22) and/or the blackened area (20) of the border (18), in addition to the mark (24). Thus, the border can be formed by the same principles as discussed above with respect to the mark (24) itself.

In a further alternative embodiment (not shown), the patch itself is formed as a flexible or non-rigid sheet or film that contains the laser active particles. The film may then be placed in a mold during a film insert molding (FIM) process and the substrate (26) simultaneously formed and joined to the film. Once coated with the desired weathering or abrasion resistant coatings, portions of the film can be exposed to the laser light so as to appropriately activate the particles and render the mark (24) and/or border (18) visible. Alternatively, the film may be of a reduced size, one that is less than fully extending over the surface of the glazing (12). In such a construction, the film portion is be located in a mold and joined to the substrate (26) via film insert molding, at the appropriate location for the mark.

In a further alternative embodiment of the invention, the particles of the patch (36) are instead incorporated directly into the primer layer (34). The primer layer (34), seeded with the particles, is then applied to the substrate (26). As a result of the size of the laser active particles, this alternative may result in a layer of primer layer (34) that is thicker than would be typically applied.

As seen from the above discussion, with the present invention, actual formation of the mark (24) is deferred until the glazing (12) is fully formed in all respects bearing on certification. Additionally, by locating the mark (24) at a subsurface location, the mark (24) is not subjected to rubbing or scraping and, therefore, readily meets the permanence requirements of the previously mentioned governmental regulations.

Figure 4:
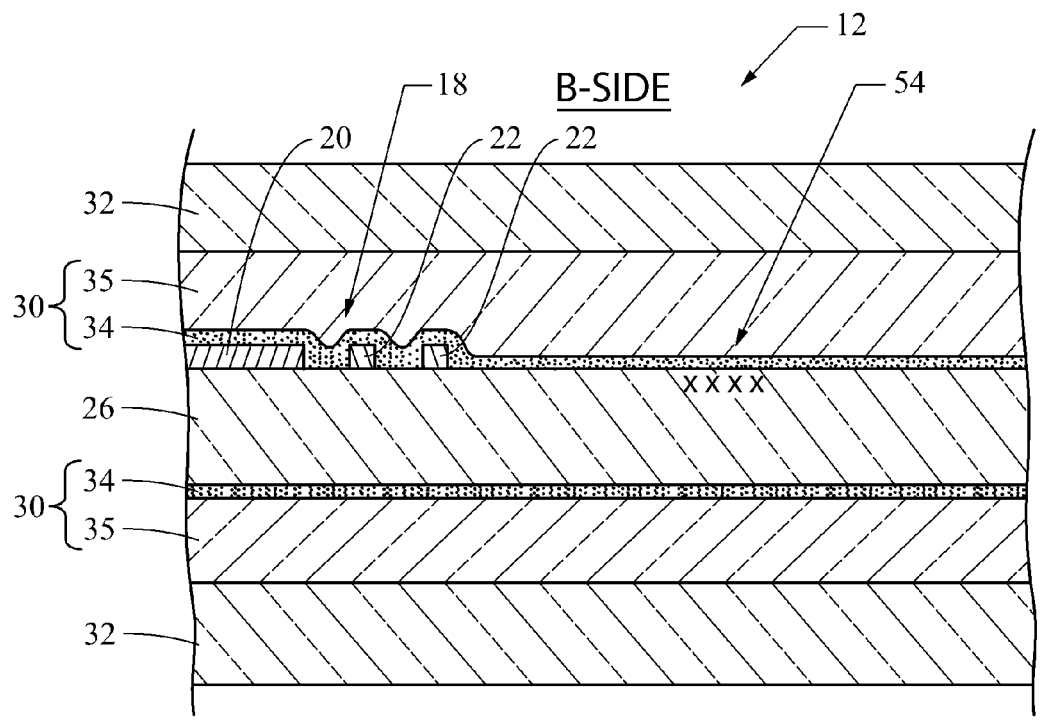
FIG. 4 is a cross-sectional schematic illustration, similar to that of FIG. 2, of a glazing embodying the principles of the present invention.

Referring now to FIG. 4, seen therein is a glazing (12) according to an alternative embodiment. The glazing (12) of FIG. 4 is identical to the glazing of FIG. 2 in the majority of respects and, therefore, like elements are provided with like reference numerals. Accordingly, a discussion of all the elements of the glazing (12) in FIG. 4 is not provided herebelow and reference should be made to the prior discussion of FIG. 2. The following discussion proceeds with the variances of the glazing (12) of FIG. 4 from that of the glazing (12) illustrated in FIG. 2.

In the embodiment of FIG. 4, the mark, designated at (54), is formed at a subsurface location of the glazing (12) after the glazing (12) has been fully formed. In this embodiment, the mark (54) is directly formed within the substrate (26) or alternatively within another layer of the glazing (12). The mark (54) is achieved with a degradation or modification of localized material by a laser light only in the area or layer where the mark (54) is desired. The localized material absorbs the laser light which induces a color change reaction in the surrounding polymer matrix. No damage or effect results on the surface of the glazing (12). This allows for a mark (54) without any effect to the physical, aesthetic, chemical, mechanical or other material properties, attributes and characteristics of the glazing (12).

The glazing (12) seen in FIG. 4 is achieved by first forming a glazing by known and conventional means. Thereafter, the process involves the subsurface marking of the glazing (12) through the use of a laser and associated hardware and software. As depicted in FIG. 4, the mark (54) is formed in the substrate (26) itself.

In performing this method, the data, image or file representing the mark (54) is converted to a grayscale monochromatic image or file and loaded into conventional laser guiding software. While grayscale imaging software and bit map marking are preferred, it will be appreciated that other software systems could be used to achieve the same results. For example, the method could be realized through the use of vector type marking files. With bit map marking, a series of closely spaced individual dots/pixels are formed and their overall presentation forms the image. The pixels may be singly located or overlap one another to produce a darker, more dense and contrasted image. With vector marking, the laser light is drawn across the part to render a continuous line. Vector marking has the benefit of being faster, commonly available, less expensive, using fixed power, creating solid images (filled areas between solid borders) and facilitating time and date stamping. With the image file loaded into the laser marking software, the appropriate laser hardware and software settings are then applied to the hardware and the software. These settings are determined by a variety of factors, which include the type, thickness and sensitivity of the layer in which the mark is to be formed (and the nature of the laser active particles in the prior embodiment). Appropriate optics and other hardware, such as beam expanders, may be employed to help in focusing the laser light into the volume of the layer where the mark (54) is desired. Additionally, concentrating layers or components may be incorporated or formed in the glazing (12) itself for use in enhancing marking of the desired layer.

Figure 5:
FIG. 5 is an enlarged plan view of a mark as may be applied in accordance with the present invention.
Figure 6:
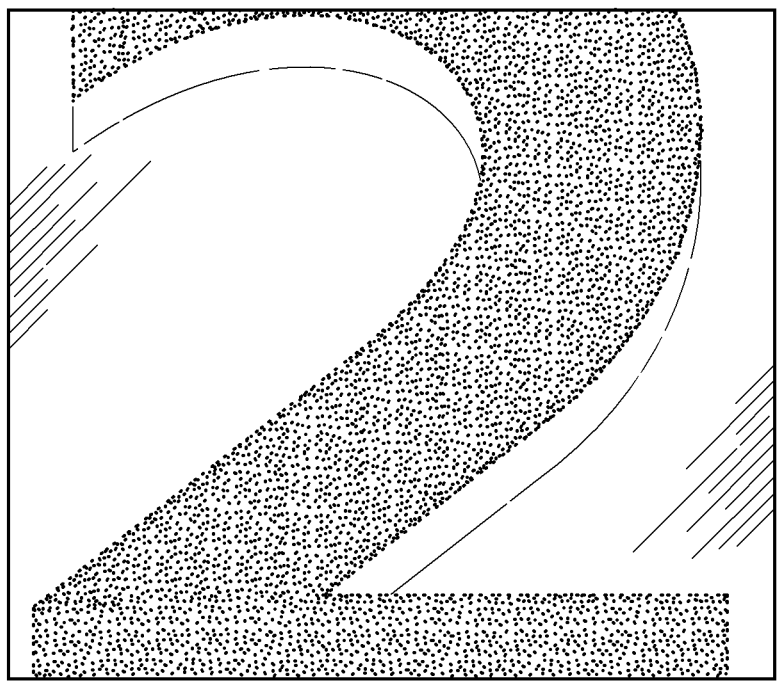
FIG. 6 is an enlarged view of a portion of the mark seen in FIG. 5.

FIG. 5 illustrates an actual mark as formed at a subsurface location in a plastic component, without the providing of a patch. FIG. 6 is an enlargement of the number "2" provided in the mark of FIG. 5.

While various hardware and software settings can be used to form a mark (54) without damage or effect on the surface of the glazing (12), the following hardware and software settings have been found suitable for achieving detailed marks (54), such as that seen in FIGS. 5 and 6, in optically clear polycarbonate substrates having protective coatings that include a weathering coating and an abrasion resistant coating. The hardware and software settings include: Nd:YAG (1064 nm) 10 watt laser with grayscale marking software (Power Line E10, manufactured by Rofin-Baasel, Inc.); 1000 dpi image; 33 amps; and 15 kHz pulses of laser light.

The mark (54) created with the current embodiment of the present invention can also be formed so as to extend beneath the edge of the border (18). This can be achieved by angling the laser (i.e., departing from normal incidence) during the application of the laser light. Additionally, by articulating the part and/or the laser while maintaining the working distance of the laser constant relative to the part, a curved part can be marked. Curved parts can further be accommodated by actively controlling the focal point of the laser light at the desired depth within the part, while articulating the part or the laser. By rendering the mark (54) at various depths within the part, the mark (54) can be formed with a three-dimensional impression or with a shadow effect. In addition to or in conjunction with the above methods, suitable additives can be provided in the substrate matrix material (or in coatings thereon) to control and/or enhance mark color, contrast, resolution, and/or to alter the effective laser parameters, or to accommodate a laser-sensitive coating.

As seen from the above, the present invention provides a suitable method for forming a plastic component having a mark permanently provided therein, at a subsurface location, after fully forming the component, and, for glazings, in all respects that materially bear on certification of the glazing. While the present invention has been described specifically in relation to glazings for automotive vehicles, it will be apparent to those skilled in the art that the principles of the present invention are applicable to transparent, semi-transparent and non-transparent applications in automotive vehicles (other than glazings), as well as plastic components outside of the automotive field (regardless of their degree of transparency).

The foregoing invention has been described in accordance with the relevant legal standards, thus the description is exemplary, rather than limiting, in nature. Variations and modifications to the disclosed embodiments may become apparent to those skilled in the art and fall within the scope of the invention. Accordingly the scope of legal protection afforded this invention can only be determined by studying the following claims.

What is claimed is:

1. A method of making a plastic panel assembly having a permanent mark therein, the method comprising:
    applying a protective coating on a thermoplastic substrate, a surface of the protective coating defining an exterior surface of the panel assembly; and
    after applying the protective coating, exposing a portion of the panel assembly to a laser light so as to cause a location within the substrate to become opaque thereby defining the mark within the substrate;
    wherein the panel assembly is an automotive glazing.

2. The method of claim 1 wherein the protective coating includes a primer layer and a topcoat.

3. The method of claim 1 wherein the protective coating comprises a topcoat and an abrasion resistant coating applied over the topcoat.

4. The method of claim 1 wherein the thermoplastic substrate comprises polycarbonate, acrylic, polyacrylate, polyester, polysulfone, copolymers, or a combination comprising at least one of the foregoing.

5. The method of claim 2 wherein the topcoat is a weathering layer.

6. The method of claim 1 further comprising curing the protective coating.

7. The method of claim 1, wherein the mark is formed at a localized area of the panel assembly.

8. The method of claim 7, wherein the mark does not extend through the panel assembly.

9. A method of making a plastic panel assembly having a permanent mark therein, the method comprising:
    applying a protective coating on top of a thermoplastic substrate, a surface of the protective coating defining an exterior surface of the panel assembly; and
    after applying the protective coating, exposing a portion of panel assembly to a laser light so as to cause a location within the substrate to become opaque thereby defining the mark at the location;
    wherein the panel assembly is an automotive glazing; and
    wherein the thermoplastic substrate is transparent.

10. A method of making a plastic panel assembly having a permanent mark therein, the method comprising:
    applying a protective coating on top of a thermoplastic substrate comprising polycarbonate, and
    after applying the protective coating, exposing a portion of panel assembly to a laser light so as to cause a location within the substrate to become opaque thereby defining the mark at the location;
    wherein the panel assembly is an automotive glazing, and
    wherein an area surrounding the mark is transparent.

* * * * *